(12) United States Patent
Clasen et al.

(10) Patent No.: US 7,726,338 B2
(45) Date of Patent: Jun. 1, 2010

(54) VALVE WITH CERAMIC DISCS

(75) Inventors: Keith Clasen, Apple Valley, MN (US); Adam Platt, New Market, MN (US)

(73) Assignee: Uponor Innovation AB, Virsbo (SE)

( * ) Notice: Subject to any disclaimer, the term of this patent is extended or adjusted under 35 U.S.C. 154(b) by 206 days.

(21) Appl. No.: 11/924,916

(22) Filed: Oct. 26, 2007

(65) Prior Publication Data

US 2009/0108224 A1   Apr. 30, 2009

(51) Int. Cl.
*F16K 3/08*   (2006.01)
(52) U.S. Cl. .................. 137/625.31; 251/208; 251/292; 251/304; 251/340
(58) Field of Classification Search ................ 251/208, 251/292, 304, 340; 137/625.31
See application file for complete search history.

(56) References Cited

U.S. PATENT DOCUMENTS

| | | | | |
|---|---|---|---|---|
| 3,630,484 A | * | 12/1971 | Taylor | ......................... 251/208 |
| 3,812,882 A | * | 5/1974 | Taylor | ......................... 251/208 |
| 4,549,579 A | * | 10/1985 | Bergmann | ................... 251/208 |
| 4,554,943 A | * | 11/1985 | Claney et al. | ................ 251/208 |
| 4,554,948 A | * | 11/1985 | Bergmann | ............. 137/625.31 |
| 4,674,537 A | | 6/1987 | Bergmann | |
| 4,848,403 A | * | 7/1989 | Pilolla et al. | ................. 251/304 |
| 4,934,654 A | * | 6/1990 | Linnemann | ................. 251/292 |
| 5,127,438 A | | 7/1992 | Williams | |
| 5,236,006 A | * | 8/1993 | Platusich et al. | ............ 251/292 |
| 2006/0086923 A1 | | 4/2006 | Shank et al. | |

* cited by examiner

*Primary Examiner*—John Bastianelli
(74) *Attorney, Agent, or Firm*—Occhiuti Rohlicek & Tsao LLP

(57) ABSTRACT

A valve comprises a housing and at least three ceramic discs in the housing such that at least two fixed ceramic discs are provided and at least one rotatable ceramic disc is provided between the fixed ceramic discs. The ceramic discs comprise through holes such that when the holes are aligned, the valve is open, and turning the rotatable ceramic disc turns the holes to be misaligned in successive ceramic discs, which prevents water flow through the valve. The valve further comprises a handle for rotating a rotatable ceramic disc and the handle comprises a stem extending through the housing, and a curved part, the curved part curving at least partly around the housing along the circumference of the housing.

6 Claims, 1 Drawing Sheet

VALVE WITH CERAMIC DISCS

FIELD OF THE INVENTION

The invention relates to a valve suitable for potable water applications.

BACKGROUND OF THE INVENTION

U.S. 2006/0 086 923 discloses a valve assembly including a first gate having at least one opening and a second gate having at least one opening, the second gate being spaced from the first gate. The valve assembly has first and second discs disposed between the first and second gates, each disc having at least one opening. The assembly also includes a biasing element disposed between the first and second discs for normally urging the discs away from one another and toward opposing inner faces of the first and second gates. The first and second discs are rotatable. The valve assembly is in an open position when the openings of the rotatable discs are in alignment with the openings in the stationary gates. Turning the rotatable discs such that the openings in the rotatable discs are not in alignment with the openings of the stationary gates makes the valve assembly to adopt a closed position, so that no fluid is allowed to flow therethrough. The rotatable disc is provided with a surrounding gear ring and the valve assembly further comprises a worm drive. The outer surface of the gear ring includes teeth that engage with threads on the worm drive. In operation, as the worm drive rotates about its longitudinal axis, the threads engage with the gear teeth on the outer surface of the ring gear for rotating the ring gear. As the ring gear rotates, the rotatable discs rotate simultaneously therewith. The worm drive is operated by a motor for moving the valve between open and closed positions.

U.S. Pat. No. 5,127,438 discloses a faucet comprising three ceramic discs inside a housing. The first and the third disc are stationary and the second disc is rotatable by a stem forming a handle and located between the first and the third disc. The ceramic discs comprise holes such that when the holes are aligned, the faucet is open, and turning the rotatable ceramic disc turns the holes to be misaligned in successive ceramic discs which prevents water flow through the faucet. The housing is formed by a female housing and a male housing, such that the female housing is positioned on the male housing. A slot is provided through the female housing and the male housing, which slot forms a handle window. The stem forming the handle extends through the window. The first and third ceramic discs are axially movable by outwardly extending ears which extend into vertical grooves inside a side wall of the housing. The stem is attached to a pan and the rotatable ceramic disc is seated in the pan. The rotatable ceramic disc has ears extending outwardly from its side wall and the pan comprises axial grooves, whereby the axial movement of the rotatable disc is also permitted.

BRIEF DESCRIPTION OF THE INVENTION

An object of the invention is to provide a new type of a valve.

The invention is characterized by comprising a housing, at least three ceramic discs in the housing such that at least two fixed ceramic discs are provided and at least one rotatable ceramic disc is provided between the fixed ceramic discs, the ceramic discs comprising through holes such that when the holes are aligned, the valve is open, and turning the rotatable ceramic disc turns the holes to be misaligned in successive ceramic discs, which prevents water flow through the valve, and a handle for rotating the rotatable ceramic disc, wherein the handle comprises a stem extending through the housing, and a curved part, the curved part curving at least partly around the housing along the circumference of the housing.

The idea of the invention is that the valve comprises a housing and at least three ceramic discs in the housing, such that at least two fixed ceramic discs are provided and at least one rotatable ceramic disc is provided between the fixed ceramic discs. The ceramic discs comprise through holes such that when the holes are aligned, the valve is open, and turning the rotatable ceramic disc turns the holes to be misaligned in successive ceramic discs, which prevents water flow through the valve. The valve further comprises a handle for rotating the rotatable ceramic disc and the handle comprises a stem extending through the housing, and a curved part, the curved part curving at least partly around the housing along the circumference of the housing. Because the handle comprises a curved part, the size of the valve is quite small, such that it does not require a large space around it. Further, the valve is durable such that it does not break easily. The structure of the valve is also simple in design because the valve has only two moving parts i.e. the rotatable disc between the fixed discs and the handle. All in all, the aesthetic appearance of the valve is extremely good, In an embodiment, the curved part of the handle has a length that is larger than one half of the circumference of the housing such that the curved part of the handle extends around at least one half of the circumference of the housing. The handle can be snapped on and off the housing. Snapping off the handle provides the feature that the rotatable disc cannot be rotated, whereby an unauthorized person cannot change the position of the valve.

BRIEF DESCRIPTION OF THE DRAWINGS

In the following, the invention will be described in greater detail by means of preferred embodiments with reference to the accompanying drawings, in which FIG. 1 schematically shows a cross-sectional side view of a valve, and FIG. 2 schematically shows a cross-sectional end view of the valve, especially illustrating a rotatable disc and a handle attached to the rotatable disc.

DETAILED DESCRIPTION OF THE INVENTION

Figure 1:
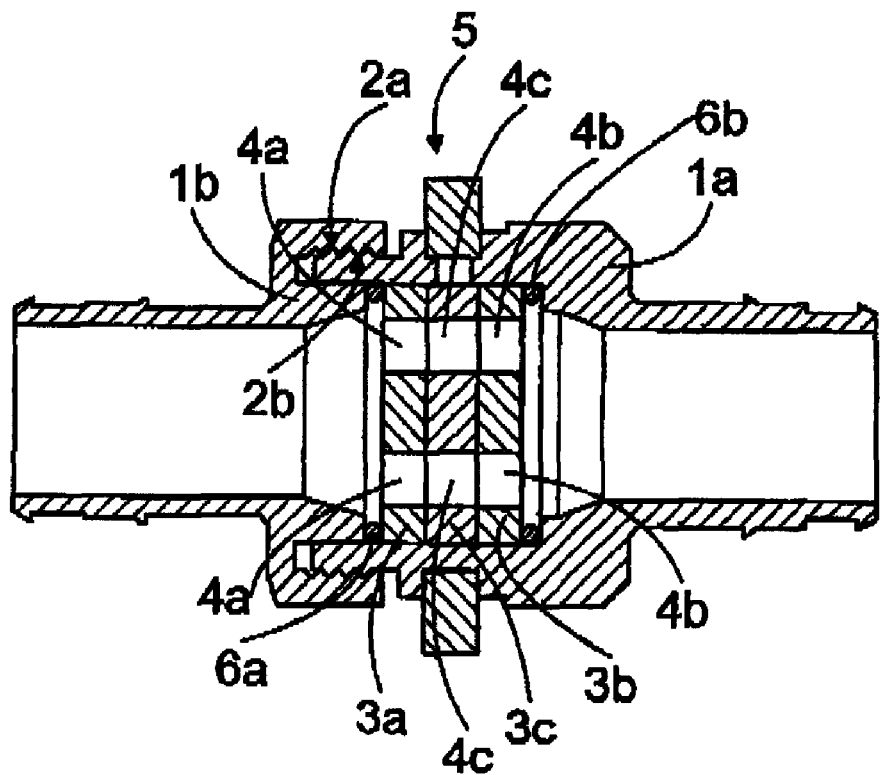

FIG. 1 discloses a valve comprising a housing and three ceramic discs inside the housing. The housing comprises a female housing 1a and a male housing 1b. The female housing 1a comprises an outer thread 2a and, correspondingly, the male housing 1b comprises an inner thread 2b, whereby the female housing and the male housing are threaded together to form a unitary housing.

The ceramic discs are arranged such that two fixed ceramic discs 3a and 3b are provided and one rotatable ceramic disc 3c is provided between the fixed ceramic discs 3a, 3b.

The fixed ceramic discs 3a, 3b comprise through holes 4a, 4b and, correspondingly, the rotatable ceramic disc 3c comprises through holes 4c. When the through holes 4a, 4b in the fixed ceramic discs 3a, 3b are aligned with the through holes 4c in the rotatable ceramic disc 3c, the valve is open. Turning the rotatable ceramic disc 3c turns the through holes 4c in the rotatable ceramic disc 3c to be misaligned with the through holes 4a, 4b in the fixed ceramic discs 3a, 3b, which prevents water flow through the valve.

The rotatable ceramic disc 3c is turned or rotated by a handle 5. The handle 5 is turned manually. Thus, the valve is manually operated.

The ceramic discs 3a, 3b are sealed against the housing 1a, 1b by elastomer seals 6a, 6b. The elastomer seals 6a, 6b can be made, for example, from EPDM-rubber. The ceramic discs 3a, 3b, 3c are watertight against each other such that no sealings are necessary between the ceramic discs 3a, 3b, 3c. The housing and the other parts of the valve can be made e.g. from plastics such as polyamide PA, polysulfone PSU, poly (phenylene sulfone) PPSU, or polypropylene PP.

The benefit of the three disc design is that the moving component, i.e. the rotatable ceramic disc 3c, is not moving against the elastomer seal 6a, 6b but just against another ceramic disc 3a, 3b. This reduces both wear of the sealing surfaces and chances of the elastomer seal 6a, 6b becoming damaged and leaking.

Figure 2:
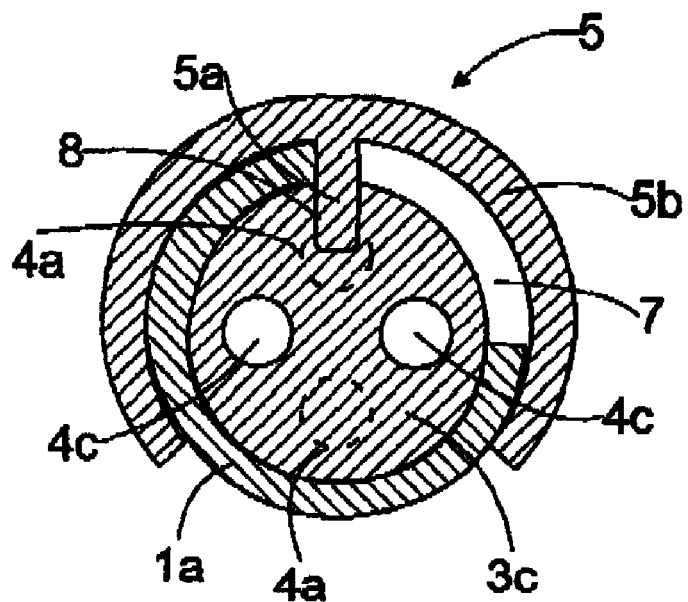

FIG. 2 shows a structure of the handle 5. In FIG. 2 the valve is in a closed position, whereas in FIG. 1 the valve is in an open position.

The handle 5 comprises a stem 5a and a curved part 5b. The stem 5a extends through the housing 1a. The curved part 5b curves at least partly around the housing 1a along the circumference of the housing 1a.

The housing 1a is provided with a window 7. The window 7 allows the stem 5a to extend through the housing 1a. The window 7 also allows the handle 5 to be rotated with respect to the housing 1a. The size of the window 7 is only one quarter of the circumference of the housing 1a. Thus, the handle 5 can be rotated about 90° around the housing 1a. Thus, the valve is a quarter turn valve, which means that only a quarter turn is needed to turn the valve between open and closed positions. The outer surfaces of the handle 5 and the housing 1a are provided with markings to show the user the open and closed positions of the valve.

The stem 5a is positioned in a cave 8 in the rotatable ceramic disc 3c. When the stem 5a is positioned in the cave 8 the handle 5 prevents the rotatable disc 3c from moving axially.

The female housing 1a and the male housing 1b overlap only at the end part of the valve, where the threads 2a and 2b are positioned. Thus, only either the female housing 1a or the male housing 1b has to be provided with a window 7.

Preferably, the length of the curved part 5b is larger than one half of the circumference of the housing 1a, such that the curved part 5b of the handle extends around at least one half of the circumference of the housing. When the curved part of the handle is relatively long it is relatively simple and easy to operate the handle manually. Also, when the length of the curved part 5b of the handle is more than one half of the circumference of the housing, arms forming the curved part extend partly around the housing. This provides the feature that the handle 5 can be snapped on and off the housing. Snapping the handle 5 on and off is provided by the feature that the material of the arms is somewhat yielding. The handle can be provided with this feature e.g. by making the handle of plastics.

When the handle 5 is snapped off, it is extremely difficult to rotate the rotatable ceramic disc 3c. Thus, snapping off the handle prevents an unauthorized person from changing the position of the valve.

The valve is used in potable water applications. The valve can be positioned e.g. underneath a sink or a toilet to prevent water flow e.g. during the assembly of the sink or toilet. Thus, when this kind of valve is used, it is not necessary to turn off the total water flow in the building. The valve can also be used as an inline type valve, e.g. for preventing water flow in some part of a pipe system.

It will be obvious to a person skilled in the art that as technology advances, the inventive concept can be implemented in various ways. The invention and its embodiments are not limited to the examples described above but may vary within the scope of the claims.

The invention claimed is:

1. A valve comprising
a housing,
at least three ceramic discs in the housing such that at least two fixed ceramic discs are provided and at least one rotatable ceramic disc is provided between the fixed ceramic discs, the ceramic discs comprising through holes such that when the holes are aligned, the valve is open, and turning the rotatable ceramic disc turns the holes to be misaligned in successive ceramic discs, which prevents water flow through the valve, and
a handle for rotating the rotatable ceramic disc, wherein
the handle comprises a stem extending through the housing, and a curved part, the curved part being positioned outside of the housing and curving at least partly around the housing along the outer circumference of the housing.

2. A valve according to claim 1, wherein
the handle is attached to the rotatable ceramic disc by means of a snap-fitting allowing the handle to be snapped off from the valve.

3. A valve according to claim 1, wherein
the curved part of the handle has a length that is larger than one half of the circumference of the housing such that the curved part of the handle extends around at least one half of the circumference of the housing.

4. A valve according to claim 3, wherein arms forming the curved part are formed such that the handle can be snapped on and off the housing.

5. A valve according to claim 1, wherein
the stem is attached to the rotatable ceramic disc such that the axial movement of the rotatable ceramic disc is prevented.

6. A valve according to claim 1, wherein
the housing is formed by a female housing and a male housing, whereby the female housing and the male housing overlap only at an end part of the valve such that the stem extends through only either the female housing or the male housing.

* * * * *